Fig. 2

Aug. 17, 1943.  M. ARTZT  2,326,740
BROADCAST FACSIMILE TRANSMISSION
Filed Aug. 3, 1940   6 Sheets-Sheet 3

INVENTOR.
MAURICE ARTZT
BY  H. S. Grover
ATTORNEY

Patented Aug. 17, 1943

2,326,740

UNITED STATES PATENT OFFICE 2,326,740

BROADCAST FACSIMILE TRANSMISSION

Maurice Artzt, Haddonfield, N. J., assignor to Radio Corporation of America, a corporation of Delaware Application August 3, 1940, Serial No. 350,339

26 Claims. (Cl. 178—6.6)

This invention relates to radio broadcasting and recording of facsimile messages and pictures.

In picture recording there must be synchronization of the receiving recorder with the transmitting scanner. This synchronization involves two things. First, the scanning and recording points must move across the sheet at exactly the same rate per line to produce a square-sided picture. Second, the recording point must start at the right place to properly frame the picture at the receiver.

In point-to-point radio facsimile and picture recording, the problem of obtaining identical or proportional speeds at the transmitter and receiver has been satisfactorily solved by use of standard units generating a constant frequency, but the initial cost of these units and the technical maintenance required precludes their use in broadcast recorders for general home use.

Synchronization has also been obtained by the well-known start-stop method of the commercial telegraph printer. This involves governors or equivalent speed control devices that also require more service than desired in a recorder used by the general public.

A method heretofore used for obtaining synchronization of the recorder and scanner in broadcast facsimile work is to energize the scanner and recorder motors from the same alternating current power service. This use of a common power service is possible only in a restricted area and this precludes its general use.

It has been proposed for broadcast facsimile work to transmit with a picture signal, an alternating frequency that is identical with that driving the scanner motor, and use it to drive the recorder motor after it is filtered and amplified. This would seem to be an ideal method, but it has been found from numerous trials to be generally unreliable because of amplitude changes at the receiver resulting from fading. These amplitude changes produce a shift in phase of the 60 cycle or other frequency. I have also found that shifts in phase are produced by the picture signals shock-exciting the receiving circuits. All these shifts in phase give the recorder motor the "jitters," which produce fuzzy details in the picture. For this reason, the transmission of the power frequency by radio has not been in successful use.

It is an object of this invention to devise a reliable synchronizing system capable of general broadcast facsimile service.

Another object of this invention is to provide a speed control system capable of general use outside of the territory supplied by the power supply at the transmitting station.

Another object of the invention is to transmit virtually a square wave signal component for controlling the speed of the recording motor, to avoid phase shifts through fading or other amplitude variations.

Another object of the invention is to frequency-modulate a sub-carrier frequency by means of the scanner output and amplitude-modulate a radio frequency carrier by these frequency modulations and an interrupted speed control frequency, the second harmonic of which is well below the modulating frequency.

Another object is to include with the frequencies modulating a carrier wave, as outlined in the immediately preceding object, a framing frequency at the beginning of each scanned line that is intermediate between the scanner frequencies and the second harmonic of the speed control frequency, for controlling the framing of the picture at the recorder.

Another object of the invention is to modulate a radio frequency carrier with an alternating frequency interrupted at the frequency of the alternating source driving the scanning motor, detecting the transmitting wave and using it to control an oscillator at the receiver for generating the driving voltage of the recording motor.

Other objects will appear in the following description, reference being had to the drawings, in which.

In the various figures of the drawings, similar parts are designated by the same reference characters.

Figure 1:
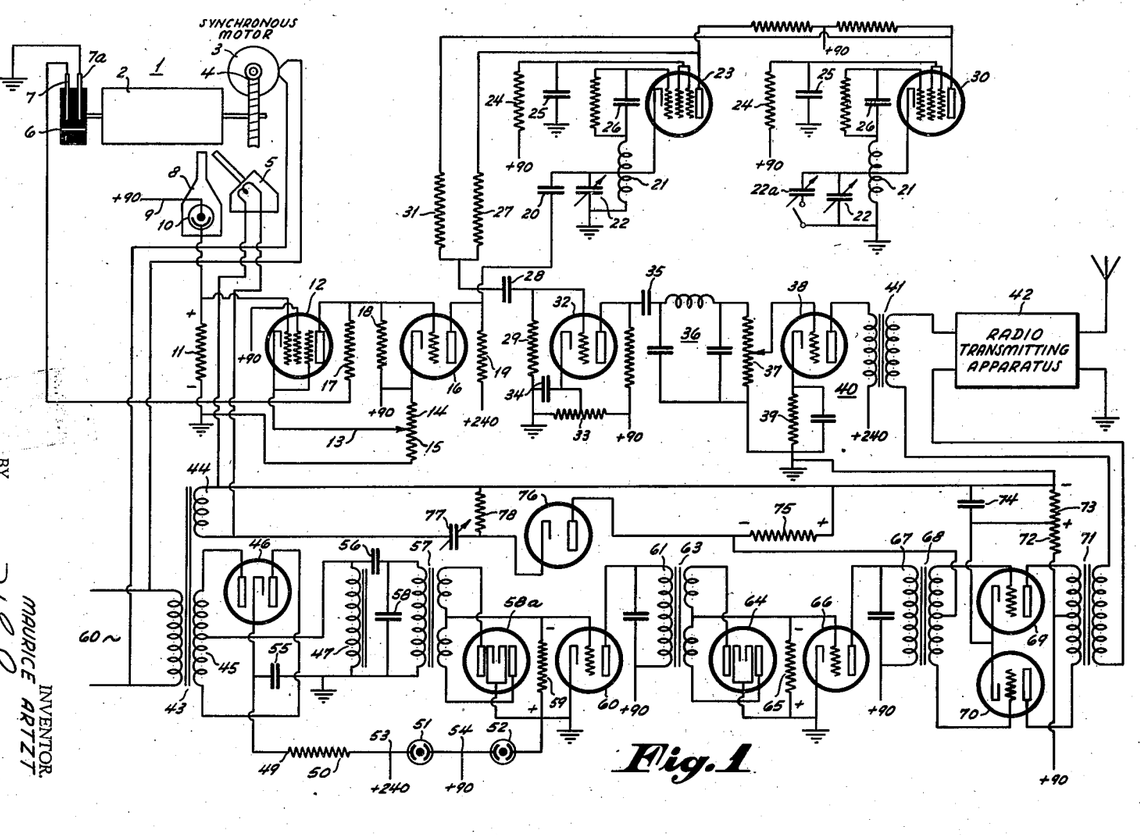
Fig. 1 is a diagrammatic illustration of the transmitter circuits.

Referring to Figure 1 of the drawings, reference character 1 generally indicates the scanner, which has been shown in conventional form for ease in understanding the drawing. The scanning drum 2 is continuously rotated through appropriate gearing 4 by a synchronous motor 3 connected to the 60 cycle supply. The light source 5 is the usual illuminating element for the scanner. The shaft of drum 2 contains a circuit-closing arrangement which may be of any form, but by way of example it has been shown as a commutator having a bar 6 adapted to connect brushes 7, 7a once during each revolution as the photocell unit 8 and the lamp 5 reach a marginal line of the picture.

The anode lead 9 of the photo-electric cell 10 is connected to a source of supply, which by way of example I have illustrated as being 90 volts positive. The cathode of this cell is connected to ground through load resistance 11 and the control grid of tube 12 is connected to a positive point in this resistance. The cathode and suppressor grid of tube 12 are connected by conductor 13 between resistances 14, 15, joined between ground and the cathode of tube 16. This tube has its grid connected to the plate of tube 12 and it is also connected through resistance 17 to brush 7, the other brush 7a being grounded. The screen grid of tube 12 may be connected to the plus 90 terminal of the source of supply. The plate of tube 12 is connected through resistance 18 to a source of supply indicated as 90 volts positive. This positive terminal is also connected to the cathode of tube 16.

The vacuum tubes 12 and 16 are D. C. amplifiers for the scanner output and this is introduced into a frequency shift unit similar to a super-heterodyne beat oscillator circuit. This is done by connecting the anode of tube 16 through an appropriate resistance 19 to the plus 240 volt terminal of the supply. This anode is then connected through tuning condenser 20 to a point in inductance 21, across which inductance is placed tuning condenser 22. The point referred to is connected to the cathode of oscillator tube 23. This tube has its double screen grid connected through an appropriate resistance 24 to the plus 90 volt terminal of the source of supply. An appropriate condenser 25 may be connected between the screen grid and ground, as shown. The control grid of tube 23 has an appropriate condenser and grid leak 26, through which the grid is connected to one end of inductance 21 the other end of this inductance being connected to ground. The anode of tube 23 is connected through resistance 27 and condenser 28 and resistance 29 to ground.

Oscillator tube 30 has parts similar to certain parts of oscillator tube 23 and these and their connections have been given the same reference characters, so that further explanation of them is not required. The anodes of oscillator tubes 23 and 30 are connected through appropriate resistances to the positive 90 volt terminal of the source of supply. The anode of tube 30 is connected through resistance 31 to the condenser 28.

The input grid of the oscillator detector tube 32 is connected to the ungrounded end of resistance 29 and the plate is connected through an appropriate resistance to the plus 90 volt terminal of a source of supply. This source of supply is also connected through resistance 33 to ground, and the cathode of tube 32 is connected to an intermediate point of this resistance. It is also connected through a by-pass condenser 34 to the ground terminal.

The anode of the detector tube 32 is connected through coupling condenser 35 to a low-pass filter generally indicated at 36, adapted to pass the beat frequency of oscillator tubes 23 and 30 and exclude the radio frequencies of such oscillators. The output resistance 37 of this filter has one end connected to ground and the other end adjustably connected to the grid of amplifier tube 38, the cathode of which is connected through resistance 39 to ground. A by-pass condenser 40 may shunt this resistance. The anode of amplifier tube 38 is connected to the 240 volt positive terminal of the source of supply through the primary of transformer 41. The secondary of this transformer is connected in series with the output coil of the synchronizing frequency to be presently described. The combined output is connected to the radio transmitting apparatus 42, which may consist of the usual radio frequency oscillator with amplitude-modulating means, whereby the combined frequencies from the scanner and the synchronizing unit amplitude-modulate the radio frequency carrier by means well known in the telephone art and therefore not illustrated.

The unit for producing a synchronizing frequency for the recorder at the receiving station just referred to has its input transformer 43 connected to a source of supply here indicated as 60 cycles, which is the usual commercial power frequency. The secondary coil 44 furnishes 60 cycle reduced voltage, 10 volts, for example, for the heater elements of the cathodes of the tubes of Fig. 1, which have generally been indicated as unipotential cathodes. Since these heaters are well known in the art, they and their circuits have been omitted to simplify the drawings. The lamp 5 may also be connected to this source.

Another secondary coil 45 of transformer 43 has its terminals connected to the anodes of a full wave rectifier 46. The center or intermediate point of this secondary is connected to one end of a smoothing inductor 47, the other end of which is connected to ground. The cathodes of rectifier 46 are, as usual, joined together and are connected to potential point 49 of the source of direct current supply consisting of resistor 50 and gas regulator tubes 51, 52, to ground. Tube 51 may be the well-known regulator tube VR-150 and tube 52 may be well-known tube 874. The characteristics of the circuit are such, for example, that point 49 is 350 volts positive and points 53 and 54, 240 volts positive and 90 volts positive, respectively. The various screen and anode terminals may be understood to be connected to the terminals in this voltage supply having the same voltage indication, the connections being omitted to prevent complication of the diagram.

In the filter of the voltage supply, condenser 55 by-passes the 60 cycle component of the rectified current. As is well known, the usual filter in a source of supply such as has just been described contains a 120 cycle ripple in inductors such as 47 and this ripple is used in a frequency doubling arrangement to generate a higher audio frequency to be transmitted to the receiver for operating the recorder. In this case the frequency is increased through a multiplicity of doublers to 480 cycles.

The inductor 47 of the source of supply has its high-voltage terminal connected through a stopping condenser 56 to one end of the primary coil of transformer 57 and its low-voltage side is connected to the other terminal of the transformer. This primary coil is tuned by condenser 58 to the 120 cycle component. The terminals of the secondary of transformer 57 are connected to the anodes of full wave rectifier 58a and the mid-point of the transformer secondary and the cathodes are connected to load resistance 59, the cathode being grounded. This produces a 240 cycle component in the rectified output of resistance 59. Across this resistance 59 is connected the input of vacuum tube amplifier 60. The anode of this tube 60 is connected through a tank circuit 61 tuned to 240 cycles to the 90 volt positive terminal of the source of supply. The coil of this tank circuit constitutes the primary of transformer 63. The secondary of this transformer has its opposite terminals connected to load resistance 65, the cathode or positive end of the rectifier being grounded and connected to the cathode of amplifier tube 66. The negative terminal of this resistance is connected to the grid of this amplifier tube. The anode of this tube is connected through circuit 67 tuned to 480 cycles to the 90 volt positive terminal of the source of supply. This 480 cycle component is present in load resistance 65 due to the full wave rectification by rectifier tube 64.

The coil in tuned circuit 67 constitutes the primary of transformer 68, the secondary of which is connected in push-pull fashion to the grids of tubes 69 and 70. The anodes of these tubes are connected in push-pull fashion to the primary coil of transformer 71 and the center of this coil is connected, as usual, to a 90 voltage positive terminal of the source of supply. This terminal is also connected through resistances 72, 73 to ground to produce a blocking negative bias for tubes 69 and 70 by connection of the cathodes to the junction point of these resistances. A by-pass condenser 74 may be connected around the biasing resistance, as shown.

The intermediate point of the secondary of transformer 68 is connected to one end of a variable controlled bias resistance 75 produced by rectifier 76, which has its anode connected to this same point and its cathode connected through condenser 77 to one terminal of secondary 44 of transformer 43. The other end of resistance 75 is connected to the remaining end of secondary 44 and also to ground. Resistance 78 is connected between the cathode of rectifier 76 and the positive terminal of resistance 75. This resistance 78 and condenser 77 constitute a phase shift network whose action will be described when the theory of operation of the entire transmitter is given.

The secondary coil of transformer 71 is connected in series arrangement with the secondary of transformer 41, as already referred to, with the radio transmitting and modulating apparatus 42.

Figure 2:
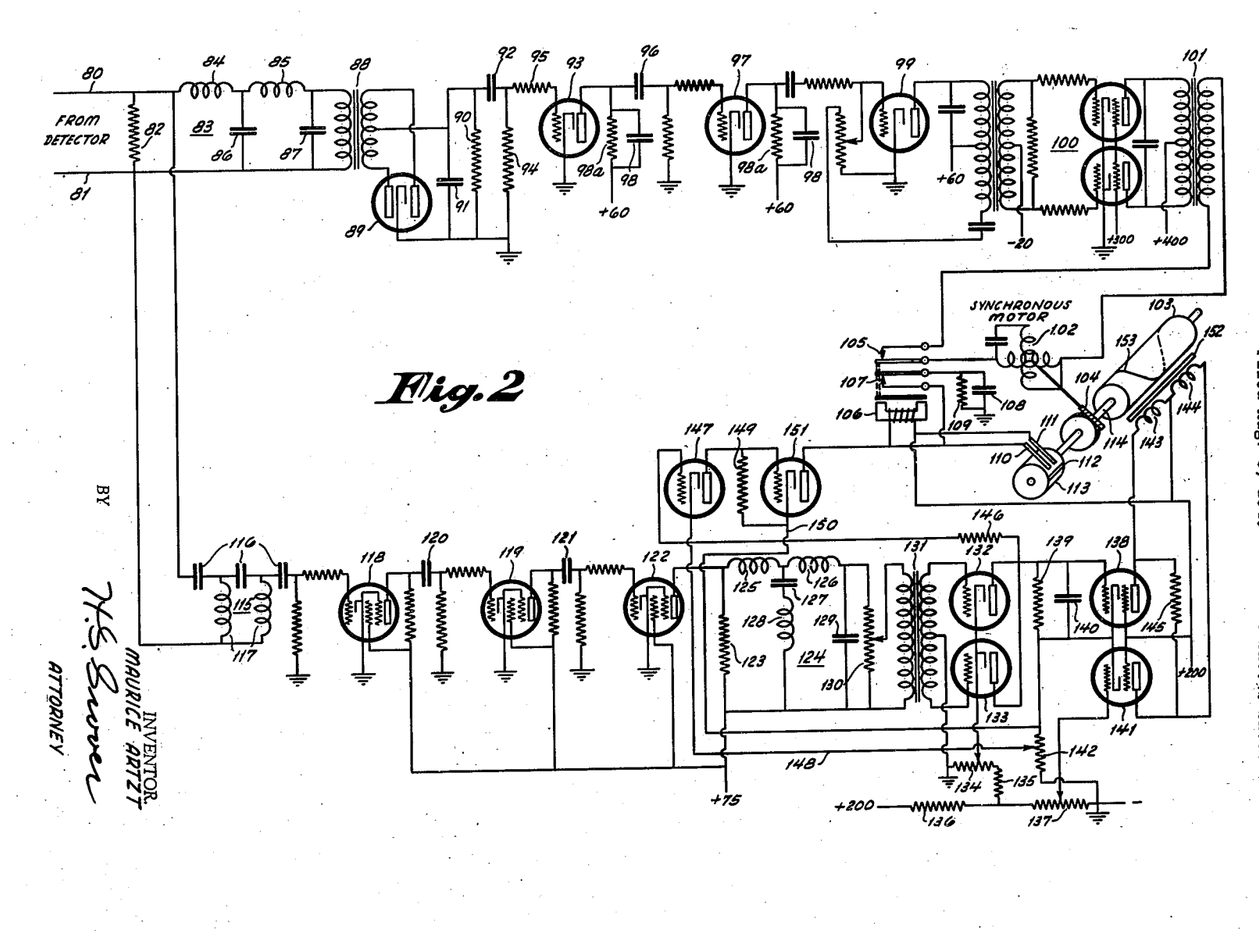
Fig. 2 is a diagrammatic illustration of the recording circuits.

In the recording circuit shown in Fig. 2, the radio receiving, detecting and amplifying circuits are not shown, as my invention is capable of use with any receiving arrangement. The audio output from the detector or amplifier is connected to the input lines 80, 81 of the recording circuit and produces a drop in load resistance 82 connected to the low-pass filter 83, which is constituted by series coils 84, 85 and shunt capacities 86, 87. This filter is adapted to pass only those frequencies that are below 1,000.

The primary of transformer 88 is connected to the output of the low-pass filter. Full wave rectifier 89 has one anode connected to one terminal of the secondary of transformer 88 and the other anode connected to the remaining terminal. The center point of the secondary and the cathode of the rectifier are connected to opposite terminals of load resistance 90, across which is shunted filter condenser 91.

The load resistance 90 is connected to the input circuit of the limiter tube 93 through blocking condenser 92. Resistances 94, 95 are incorporated in the input circuit of this tube to produce energy losses and cause the tube to saturate easily to amplitude-limit the voltage applied to the grid. This limiting action is further enhanced by the low voltage applied to the anode of the tube. This limiter tube is connected through blocking condenser 96 to the input circuit of amplifier tube 97, which has its input and output circuit arranged similar to those of tube 93 to produce the same limiting action. In both limiters the condensers 98 by-pass the harmonic frequencies around resistances 98a.

The output circuit of tube 97 is connected to the input of oscillator 99, which has its input and output circuits tuned to 60 cycles and coupled together, for generating, when uncontrolled by the transmitted synchronizing frequency, a voltage very slightly more than 60 cycles per second. The coupling between tube 97 and the oscillator 99 is close enough to cause the oscillator to lock in over a ±3 range, but is still loose enough so that shock excitation will not carry the oscillator to frequency extremes.

The output of oscillator 99 is connected to the input of power amplifier 100, having a negative bias of 20 volts, a screen grid voltage of 300 and a plate voltage of 400. These voltages, as all of the voltages given herein, are mentioned by way of example only. They, of course, may be changed as desired.

The output transformer 101 of the power amplifier has its secondary connected to synchronous motor 102, driving the recording drum 103 by suitable gears 104. The circuit from the secondary of transformer 101 to the motor includes a switch 105 controlled by relay coil 106, which is energized by the framing signal, to be later referred to. Upon energization, this relay coil 106 closes switch 107 connecting the coil 106 to ground through condenser 108. This resistance is shunted by leak resistance 109 and opens the switch 105, which interrupts the flow of 60 cycle current to the synchronous motor. The terminals of relay coil 106 are connected to framing brushes 110, 111, adapted to be connected together by commutator bar 112 on commutator 113, connected to the drum shaft 114. The relay coil 106 is therefore short-circuited for a brief time during each revolution of the drum.

High-pass filter 115 is also connected across resistance 82. This filter, consisting of series condensers 116 and shunt inductances 117, is designed to pass frequencies above 2,000 cycles per second only. The output of the high-pass filter 115 is connected to the input of the limiter amplifier tube 118. The output circuit of tube 118 is connected to another limiter amplifier tube 119. The input and output circuits of limiter tubes 118 and 119 have resistances in the input and output circuits to cause them to saturate easily and thus limit the amplitude of the output. Blocking condensers 120 and 121 prevent direct current potential of the anode circuits from being applied to the succeeding input circuit.

Amplifier tube 122 receives the output of limiter tube 119. It also has appropriate resistances in its input and output circuits arranged to produce easy saturation and limit the amplitude of its output.

Resistance 123 in the plate circuit of tube 122 is connected to demodulation filter 124 to convert the frequency variations of the scanner into amplitude variations. This filter contains series inductances 125, 126. A shunt circuit containing capacity 127 and inductance 128 is connected between the two inductances 125, 126 and the high-voltage terminal of resistance 123. This shunt is tuned to 5,000 cycles. Condenser 129 is connected from this high-voltage terminal to the output terminal of inductance 126. Resistance 130 constitutes the output of the demodulation filter.

Figure 7:
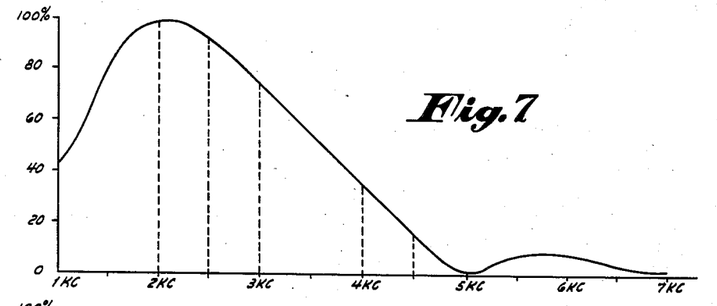
Fig. 7 is a graph representing the attenuation characteristics of the demodulation filter of Fig. 2.

It has been found that the characteristic curve of the demodulator shown in Fig. 7 should be substantially linear, not only over the region of the picture modulation (3,000 to 4,000 in the example given), but also well beyond this region, or the demodulator will produce reflections that will result in ghost-printing. It was found advisable to have the linear relation continue beyond the picture frequency limits an amount equal to the picture keying frequency. That is, with a keying frequency of 600 cycles, the linear portion of the characteristic should extend from 2,400 to 4,600 at least.

Transformer 131 has its primary adjustably tapped across resistance 130 and the secondary of the transformer is connected to the grids of amplifier tubes 132, 133. The cathodes of these tubes are joined together and adjustably connected to biasing resistor 134 and thence to ground. The center of the secondary of transformer 131 is also connected to ground. The biasing resistor 134 is connected through resistances 135 and 136 to the positive terminals shown by way of example as being 200 volts. The low-voltage end of resistance 136 is connected through resistance 137 to ground.

The anodes of tubes 132 and 133 are joined together and connected to the grid of tube 138. This grid is connected to its cathode through resistance 139 and condenser 140. Tube 141 has its grid adjustably connected to resistance 137 and its cathode connected to the cathode of tube 138. Resistance 142 is connected between these cathodes and ground.

The anodes of tubes 138 and 141 are connected to opposite terminals of the recorder coils 143, 144, which are joined together and the junction point is connected to the source of supply, which by way of example is given as 200 volts positive. This voltage is also applied to the screen grids of tubes 138 and 141. A stabilizing resistance 145 is connected across the plates of tubes 138 and 141, which reduces the effects of echoes and lessens the mechanical damping required in the recorder mechanism.

The anodes of tubes 132, 133 are connected through resistance 146 to the grid of limiting amplifier tube 147. The grid of this tube is adjustably connected through conductor 148 to resistor 142, and the plate of this tube is connected to the junction point of resistances 139 and 142. The grid cathode input circuit of amplifier tube 151 is connected across resistance 149. The anode of this tube is, as previously indicated, connected to relay coil 106 and to brush 110.

Figure 13:
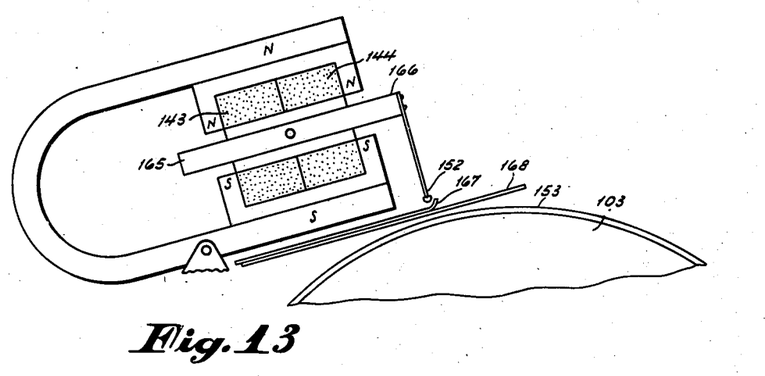
Fig. 13 is an illustration of certain parts of the recorder mechanism.

My invention is not limited to any particular system of recording, but by way of example I have shown it applied to a "carbon" type of recorder well known in the art and therefore it is shown only in conventional form in Fig. 13. It will be sufficient to say that in this type of recorder a sheet of carbon and white paper are fed between rolls over the drum 103, under the printing bar 152. The drum contains a spiral ridge 153. As the drum rotates, the point of contact between the ridge and the paper (when the bar 152 is pressed down by coils 143, 144) travels across the paper once each revolution. For a more detailed illustration and description of this type of recorder, reference is made to my article in a book entitled "Radio Facsimile," page 177 of vol. I, October, 1938, published by R. C. A. Institutes Press, New York, N. Y.

The operation of the transmitter and receiver will now be described:

Referring first to Fig. 1, it may be said that three types of signals are transmitted from the transmitting station; namely, the picture signal frequencies, the framing signal frequency and the synchronizing frequency, which latter in effect is composed of two frequencies, as will later appear.

As the scanner drum rotates relatively to the optical system, the light reflected from the picture produces a varying D. C. potential across the input circuit of amplifier tube 12. This produces an anode current varying directly with the potential variations in resistor 11. This varying anode current produces a varying drop in resistance 18, which is applied to the input circuit of tube 16. The varying potential applied to this input circuit varies the plate impedance of tube 16. This produces a variable resistance in series with the controlled condenser 20 in the tank circuit of variable oscillator 23, which varies the tuning effect of this condenser and thereby varies the frequency of the oscillator 23. Oscillator 30 has its condenser 22 adjusted to produce a frequency of, say, 300 k. c. and the condenser setting in the tank circuit of oscillator 23 is such that the frequency of that oscillator is below the fixed oscillator frequency. The oscillators may have any desired frequency, but it is satisfactory to adjust the fixed oscillator 30 for 300 k. c., with the oscillator 23 varying between 296 and 297 k. c., producing beat frequencies of 3,000 to 4,000 cycles for white and black, respectively.

The beat frequencies can be reversed in respect to shading by closing the switch and placing condenser 22a in shunt to condenser 22 in the tank circuit of oscillator 30. Condenser 22a is so adjusted that this increase in capacity sets the frequency of this fixed oscillator a corresponding amount below the frequency of the variable oscillator 23. Thus, one can reverse the picture signals, if desired, by this simple adjustment.

The picture frequencies produced by the interaction of the oscillators 23 and 30 are applied to the input circuit of the detector tube 32 through condenser 28 and resistance 29. The extracted beat frequencies are filtered by filter 36 to exclude the radio frequency and the output is amplified by tube 38 and fed into the primary of transformer 41. Before tracing the signal beat frequencies further, the operation of the framing signals will be traced to this transformer.

At one of the edges of the picture, say the beginning, on drum 2, bar 6 will momentarily connect the brushes 7, 7a and thus shunt the anode of amplifier 12 to ground. This will draw additional current from the plate supply terminal through the resistances 17 and 18 to this ground connection, producing an increased drop in resistance 18.

The increased drop in resistance 18 increases the plate-cathode impedance of tube 16 and condenser 20 in the tank circuit of oscillator 23 becomes less effective. This increases the frequency of the oscillator 23, say to 298 k. c. per second, which in interaction with the oscillator 30 will produce a beat frequency of 2,000 cycles for the framing signal. This beat frequency is extracted by the detector 32, filtered at 36 and amplified at 38 in the way described for the picture modulation frequencies and introduced into transformer 41.

The synchronizing frequency, to be combined with the picture and framing frequencies, is produced by the ripple in the reactor 47 of the plate supply. This ripple has a frequency of twice the 60 cycle supply and to accentuate it, the primary circuit of transformer 57 is tuned to 120 cycles. The output of this transformer is rectified at 58a, which produces a frequency of 240 cycles in load resistance 59. This is amplified and resonated in the input of transformer 63. The output of this transformer is again rectified, which produces a frequency of 480 cycles in the load resistance 65, which is likewise amplified at 66 and resonated at 67.

The 480 cycles in the secondary of transformer 68 is applied to the input circuit of amplifier tubes 69 and 70 in push-pull fashion. The connection between the cathodes and the mid-point of this secondary contains the negative bias produced by the drop in resistance 73 and also a variable drop in resistance 75, consisting of alternate waves of the 60 cycle supply produced by the half-wave rectifier 76 connected to the output 44 of transformer 43. The bias in resistance 73 is so adjusted that tubes 69 and 70 are blocked by the voltage drop in resistance 75, present on each alternate cycle of the 60 cycle supply. Thus, the 60 cycle frequency chops the output of transformer 71 at a 60 cycle frequency. It is desirable that the cut-off action start at zero phase for the 480 cycles and this may be produced by adjusting the condenser 77. This phases the 60 cycle voltage appearing across resistance 78, which is the input voltage for rectifier 76. Transformer 71 thus introduces into the series circuit both a 60 cycle and a 480 cycle component.

Figure 3:
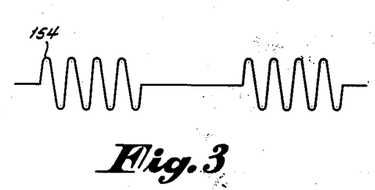
Fig. 3 is a graph representing the interrupted frequency transmitted for operation of the recorder motor.
Figure 4:
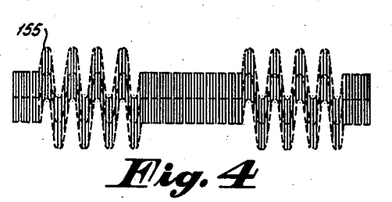
Fig. 4 is a graph representing the resultant wave containing the synchronizing wave of Fig. 3 and the variable frequency wave constituting the picture modulations.
Figure 5:
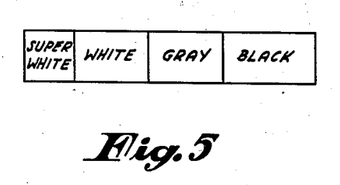
Figs. 5 and 6 are diagrams showing the relation between the framing frequency and the picture frequencies.
Figure 6:
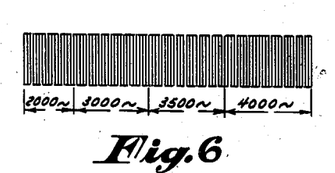

The chopped 480 cycles is represented by graph 154 in Fig. 3 and the combined synchronizing frequency and the picture frequencies are represented by graph 155 in Fig. 4, only one picture frequency being illustrated. The framing frequency is not illustrated in this Fig. 4, but it will be understood that at the beginning of each scanning line, this frequency will be substituted for the picture frequency in Fig. 4.

The combined framing, picture and synchronizing frequencies are used to amplitude-modulate the radio frequency carrier in the transmitting apparatus 42 in a way well known in the radio telephony art. The modulated radio frequency wave containing all three frequencies is radiated and received at the receiving station, where it is detected and amplified to the desired extent.

The detected current, consisting of the composite low frequency wave, produces a signal voltage across the resistance 82 in Fig. 2. Here the 480 cycle component, chopped at 60 cycles, passes through the low-pass filter 83, cutting off above 1,000 cycles. The 2,000 framing frequency and the 3,000 to 4,000 picture frequencies are blocked by this filter. These latter frequencies pass through the high-pass filter 115, which cuts off all frequencies below 2,000 cycles. This blocks passage of the synchronizing frequency through that filter.

Even if the radio frequency carrier completely fades in transmission over the air path and doubles all of the signal frequencies, the low-pass filter 83 will still pass the doubled 480 synchronizing frequency. Fadeouts, therefore, can seldom affect the synchronizing hook-up, the operation of which will first be referred to.

The 480 cycles in the secondary of transformer 88 is full wave rectified and filtered by condenser 91. This produces a 60 cycle square wave voltage drop in load resistance 90. This 60 cycle voltage is applied to the grid of amplifying limiter 93 through blocking condenser 92 and condenser 98 around anode resistance 98a by-passes harmonics present in the circuit. The limited square wave 60 cycle component is introduced into limiter tube 97, where harmonics are also eliminated by the condenser around the anode resistance. It will be understood that the drop in the anode resistance of these limiters produces a variable 60 cycle potential that is applied to the grid of the succeeding stage and by by-passing the harmonics around this resistance, no variable potential is produced in the grid circuit by any of the harmonics.

As previously stated, the oscillator 99 is set to operate at a slightly greater frequency than 60 cycles per second and the synchronizing square wave frequency of exactly 60 cycles pulls this oscillator into step, so that it produces exactly the same 60 cycle frequency that is operating the scanning apparatus at the transmitter. This 60 cycle frequency, after passing through the power amplifier 100, furnishes sufficient power to operate the synchronous motor 102, which drives the recording drum 103 at the scanning rate of the transmitter.

Returning to the framing and picture frequencies separated from the synchronizing frequency by high-pass filter 115, these are limited by amplifier tubes 118, 119 and 122 to eliminate spurious amplitude additions. The two signal frequencies then pass through the demodulation filter, which has the characteristic shown in Fig. 7. By referring to the graph in this figure, it will be seen that the framing frequency of 2,000 cycles will pass through in maximum amplitude, practically 100%, and that the picture frequencies will pass through inversely proportional to the frequency value. Since the framing and picture frequencies pass through a filter before reaching the demodulator, the amplitude values for such frequencies are slightly different from the graph given in Fig. 7. The over-all response of the receiving system is correctly illustrated by the graph of Fig. 9. The amplitude relation is more clearly indicated by the diagram of Fig. 8, where 156 illustrates the framing frequency of 2,000 cycles, 157 illustrates the frequency for white, 158 the frequency for gray and 159 the frequency for black, the frequency for gray being an average frequency. Actually the frequency for gray may vary above and below the 3,500 depending upon the approach to white or black in shade.

The framing and picture frequencies from the demodulator are introduced into the input circuit of tubes 132 and 133, which have their input circuits connected as in the usual push-pull amplifier circuit. The anodes, however, are connected in parallel to the plate supply, which in this case is furnished by the potential drop in resistance 142 in the cathode return of the succeeding amplifying stage. Resistance 134 negatively biases the grids of tubes 132 and 133 to cut off at slightly below the amplitude of the frequency for black. That is, cut-off occurs at the line 160. This gives full wave rectification for the frequencies of Fig. 8 with slight or no current for the frequency for black. The volume control on resistance 130 will also be adjusted so that the drop in resistance 139 brings tube 138 to cut off at the line 161. The rectified frequencies are applied to the input of framing tube 147 and also to the grid of the recorder amplifier tube 138. Of these, the framing frequency will be traced first.

The input circuit of amplifier tube 147 is so biased by the drop in resistance 142 that it conducts for all amplitude values of signal below the line 162 and blocks for values thereabove. Tube 151 is D. C.-coupled to tube 147 and when that tube is not blocked, the potential in resistance 149, which is negatively applied to the input circuit, holds tube 151 at cut-off. When the picture signal frequencies are applied to the input circuit of tube 147, amplifier tube 151 is at cut-off and these picture signals cannot get through to the framing relay coil 106. When the framing signal is presented to the input circuit of tube 147, that tube cuts off and the blocking bias of tube 151 is removed. The plate current of this tube then flows through either the relay coil 106 or through short-circuited brushes 110 and 111, depending upon the position of commutator bar 112. Bar 112 is positioned to short-circuit the brushes 110 and 111 when the margin end of ridge 153 on drum 103 is under the printing bar 152 (see also Fig. 13). When this bar is in this position, the recorder drum is in proper frame with the transmitting scanner drum. If the framing signal from tube 151 arrives at the time that the commutator bar is in short-circuiting position, the relay is not operated, because its coil 106 is short-circuited. Therefore, nothing happens in the correct frame position. However, if, due to fading of the synchronizing signal or other cause, the recording drum loses frame, bar 112 will not be in short-circuiting position when the framing signal arrives. The current from tube 151 produced by this framing signal will then energize relay coil 106 and open switch 105. This will cause the synchronous motor 102 to lose a half cycle or even more and the drum will be slowed down. This will continue, once each revolution, if the recorder is badly out of frame, until the short-circuiting bar 112 passes under the brushes 110 and 111 when the framing signal arrives. The recorder drum is then again in proper frame.

To insure that the switch 105 will be quickly snapped open and remain open for a sufficient time to slow the motor down one half cycle, a slugging and momentary holding circuit is established through the relay coil by switch 107, which is closed when the relay first starts to operate. The surge of current through condenser 108 slugs or snaps switch 105 open and holds it open the desired length of time. While this condenser is preferably used, it may be omitted when desired.

Returning to the picture signals, the signal frequencies 157, 158 and 159, which are full wave rectified, are applied to only one grid of the push-pull stage 138, 141; namely, to the grid of tube 138, but by the novel connection of tube 141 to the cathode resistor 142, the two tubes operate as a push-pull stage.

Figure 8:
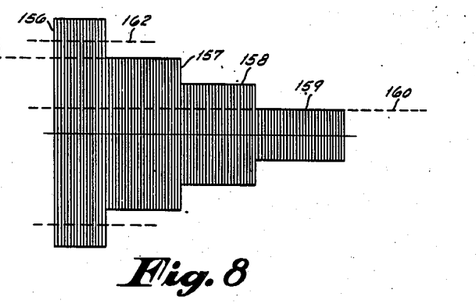
Fig. 8 is a diagram illustrating the relative amplitudes of the framing and picture frequencies after passing the demodulation filter.
Figure 9:
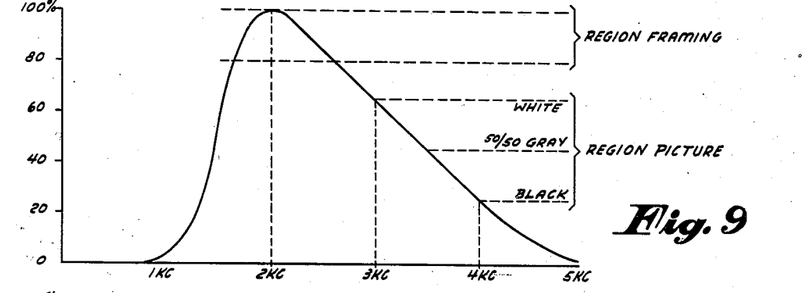
Fig. 9 is a graph illustrating the over-all response of the filters through which the framing and signal frequencies pass.

When a signal for black is impressed on the grids of tubes 132, 133, no current passes, as shown by the cut-off line 160, Fig. 8. There being no blocking potential in the input of tube 138, current passes from the terminal of the plate supply through coil 143, the internal plate circuit of tube 138 and the resistance 142 to ground, which is the negative terminal of the plate supply. The grid of tube 141 is so connected to plate supply of the bleeder 137 that it has a positive bias from that source, but this is overcome sufficiently at this time by the negative potential applied to the grid through the drop in resistance 142 to block tube 141. No current, therefore, passes through printing coil 144 and tube 141.

The current flowing through coil 143 makes the end 165 a south pole and the end 166 a north pole, as shown in Fig. 13. This swings the pivoted armature clockwise and the printing bar 152 presses the carbon 167 and paper sheet 168 against spiral ridge 153. This produces a black mark where the printing bar crosses this spiral. It will be understood, of course, that each time the drum 103 makes a rotation, a mechanism, not shown, feeds the carbon 167 and paper 168 between the printing bar 152 and the ridge 153 a distance equal to the width of a scanning line.

When a pulse of an intermediate frequency for gray, such as 158 in Fig. 8, is applied to the grid of tube 138, that tube conducts, but to a lesser extent, due to the drop in input resistance 139. The reduced current in resistance 142 fails to over-balance the positive bias of resistance 137 and tube 141 conducts an intermediate amount, which energizes printing coil 144. Coil 144, when energized, tends to move the pivoted magnet core counter-clockwise, but the adjustment is such that magnet 143 predominates, and the printing bar is moved downwards, but with reduced pressure. This prints an element of less blackness, or gray.

When the pulse 157 for white reaches the grids of tubes 132, 133, sufficient current flows in the plate circuit of the tubes to place a blocking bias in input resistance 139. Tube 138 therefore passes no current, which de-energizes printing coil 143. The drop in resistance 142 is now sufficiently reduced to permit resistance 137 to place a strong positive bias on the grid of tube 141 and it more strongly energizes printing coil 144. This moves the printing bar 152 away from the carbon entirely and no element is printed at this time. This, of course, produces a white element.

The framing signal will produce a still greater negative bias in resistance 139. Hence, this signal has the effect of "super-white."

Some of the advantages of my invention over the prior art constructions have already been given. Additional advantages may be mentioned as follows:

When a 60 cycle voltage is used to modulate a radio frequency carrier directly, as in prior art attempts to produce a synchronizing frequency, a fading of the carrier may shift the phase of the extracted 60 cycle component at the receiver a maximum of 90°, but by chopping the 480 cycles or other audio frequency higher than 60 cycles, at a 60 cycle rate, the maximum phase shift of the extracted 60 cycle frequency can never be any greater than 90° of the 480 cycle frequency, which is only 90/8 or 11.25° of the 60 cycle frequency. This means that the 60 cycle square wave in my improvement can never be shifted by fading or other amplitude change more than 11.25°. This shift can be tolerated, as it is not noticeable in the picture.

In some prior art broadcast facsimile receivers, the framing action takes place unless the framing signal arrives at the time the recorder is in correct frame. If no framing signal is received when the recorder starts a new scanning line, the framing operation is started. With this prior art construction, if the framing signal disappears due to fading or "bounce" from the automatic volume control, reframing starts into action even though the recorder is in correct frame. In my improvement, framing occurs only when the framing signal is received with the recorder out of frame. Therefore, fading of the signal when the recorder is in correct frame has no effect whatever.

In my improvement there is little chance that the framing action will take place due to noise, because there is little likelihood that interference will have the correct frequency to initiate the action. If it doesn't have a frequency of 2,000, or other frequency chosen for the framing signal, it cannot pass through the demodulating filter with the correct amplitude for operating the framing relay.

While it is desirable, it is not necessary that the picture signals be used to frequency-modulate the sub-carrier wave as in Fig. 1. They may amplitude-modulate such wave, as indicated by way of example in Fig. 10. In this figure, parts of the scaning mechanism are omitted for simplification and the framing and synchronizing units are shown by block diagrams 169 and 170, respectively. Block diagram 169 will be understood to contain the tubes and circuits of the beat oscillator and the associated tubes of Figure 1, with the exception that the photocell 8 is not connected to the oscillator circuit through amplifier tube 12 (Fig. 1). Also, in this modification, the commutator 6 has two additional brushes 171, 172 to eliminate the picture signals when the framing signal is being transmitted.

Figure 10:
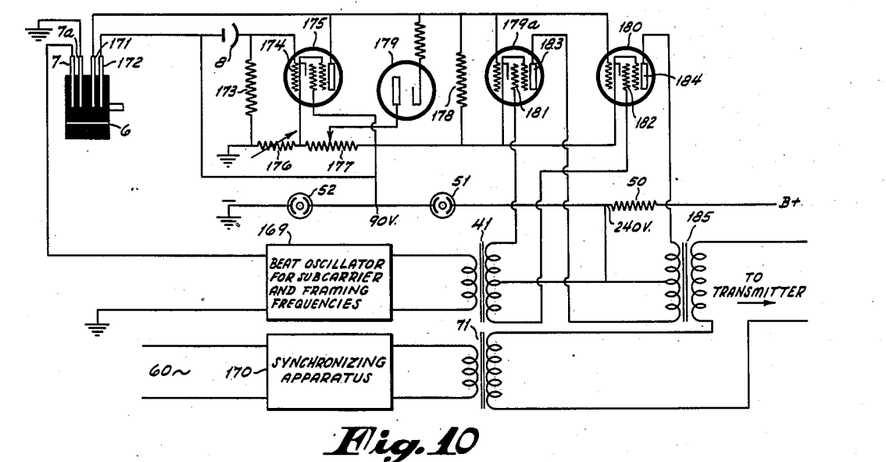
Fig. 10 is a diagrammatic illustration of a modified form of scanner and modulator circuit.

The photocell 8 in the modification of Fig. 10 has its cathode connected to the 90 volt terminal of the power supply unit of Fig. 1 and its anode connected to resistance 173, which is connected between ground and the grid 174 of pentode 175. The cathode of this tube is connected to ground through variable resistance 176. The suppressor grid of this tube is connected to the cathode, as in the previous modification, and the screen grid is connected to the 90 volt terminal. Between this terminal and the cathode is arranged resistance 177. The 90 volt terminal is connected through resistance 178 to the anode of tube 175. To provide for compensation in the manner hereinafter described, diode 179 is connected from the anode of tube 175 to a point in resistance 177. Pentodes 179a and 180 have their control grids connected to one end of resistance 178 and their cathodes connected to the other end. The suppressor grid of this tube is connected to the cathode. The additional grids 181, 182 are connected to opposite ends of the secondary of transformer 41, which is the output transformer for the beat oscillator circuit, which now contains only the sub-carrier and the framing frequencies. The anodes 183, 184 of the pentodes are connected to opposite ends of the secondary of transformer 185. The secondary of transformer 41 and the primary of transformer 185 have their midpoints connected to the 240 volt terminal of the power supply.

The synchronizing frequency in Fig. 10 is the same as that in Fig. 1 and it is to be understood that the synchronizing circuits are found in block diagram 170. The output transformer 71 for the synchronizing frequency has its secondary coil connected in series with the secondary coil of transformer 185.

The operation of the modification in Fig. 10 is as follows:

The scanner output is applied to resistance 173 so that white on the picture raises the potential of grid 174 in respect to the cathode of tube 175. This produces in load resistance 178 a negative bias for the tubes 179a, 180, that varies with the whiteness of the picture, though obviously this may be reversed if desired. The varying bias amplitude-modulates the sub-carrier frequency in the secondary of transformer 41. It will be seen that white produces the troughs in the modulation (maximum bias) and black the crests, with gray inbetween. However, when framing signal of 2,000 cycles is being transmitted, load resistance 178 is short-circuited by the commutator bar 6 and brushes 171 and 172 and no picture signals are transmitted.

The framing and picture signals of transformer 41 are combined in series and the combined current used to amplitude-modulate the radio transmitter, as already described in connection with Fig. 1.

Figure 11:
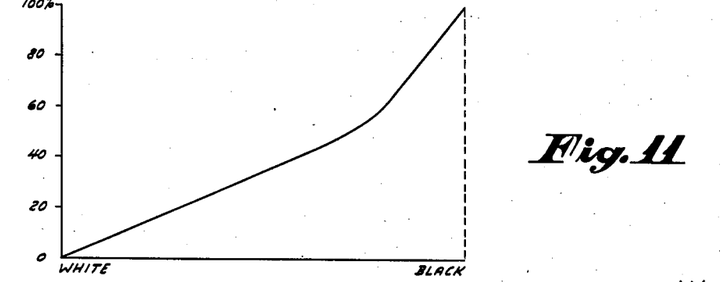
Fig. 11 is a graph illustrating the compensated output of the circuit of Fig. 10.

It is desirable to compensate this modulation so that the characteristic curve will bend upward from an intermediate point as shown in Fig. 11, where the abscissas represent shading and the ordinates represent percentage of modulation. To produce this compensation I adjust the connection of diode 179 to resistance 177 so that it conducts at all times, except when the anode current of tube 175 is practically cut off (black). As the anode current in tube 175 increases, the current through this diode will increase, because it will be shunted around a greater potential in resistance 178. This means that the resistor 178 has a conducting shunt through the diode for all signals of white and medium gray, which lowers the gain of tube 175, but this shunt is substantially removed for dark grays and black, so that the gain of the tube is increased.

Figures 12, 15, 17, 19:
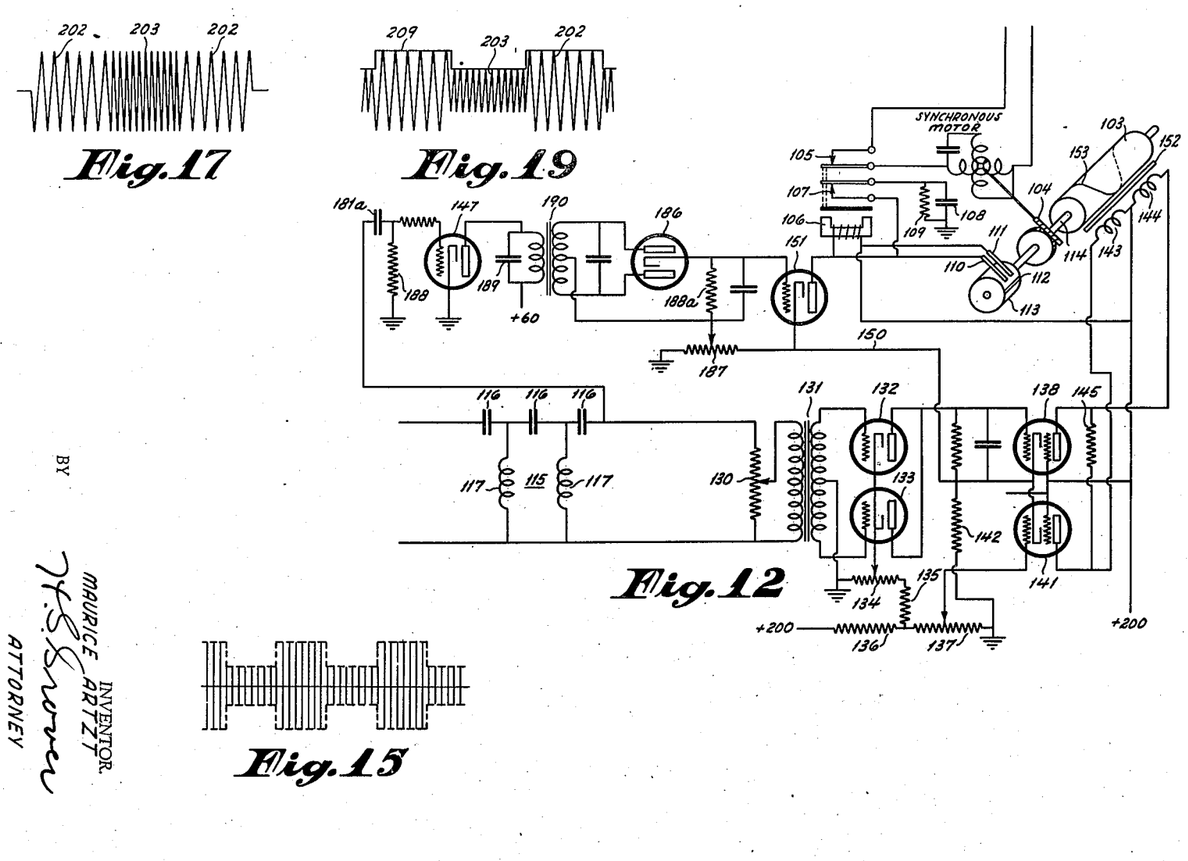
Fig. 12 is a diagrammatic illustration of a modified recording circuit for the modification of Fig. 10 when substituted for certain elements of Fig. 2.
Fig. 15 is a graph of the picture signals modulated by the synchronizing signals.
Fig. 17 is a graph illustrating the form of the synchronizing signals of the modification of Fig. 16.
Fig. 19 shows graphs of the output of the demodulation filter and rectifier of Fig. 18.

In the recorder circuit of Fig. 12 for the modified transmitter of Fig. 10, the synchronizing unit will have the same circuit diagram as in Fig. 2. The circuit for the picture and framing signals differs only slightly from that of Fig. 2. It will be understood that this part of the recorder circuit is tapped off of the input of low-pass filter 83 (Fig. 2). The limiter amplifiers and the demodulation filter are not used in this modification. The operation of the printer by the picture signals will be understood without further description, but to print a positive the outer leads of the printing coils are reversed. That is, coil 143 is connected to tube 141 and coil 144 to tube 138.

The framing tube circuits differ in Fig. 12 from those in Fig. 2 chiefly in having a full wave rectifier 186 connected between the output of tube 147 and the input of tube 151 and in having the grid of tube 147 connected to the high-voltage terminal of resistance 130 through a coupling condenser 187a with an input resistance 188 connected between the grid and ground. The cathode of tube 147 is connected directly to ground and the cathode of tube 151 is connected through resistance 187 to ground. The grid of tube 151 is connected through the load resistance 188a to an adjustable point on resistance 187, whereby the bias on the grid may be adjusted. Condenser 189 shunting the primary coil of transformer 190 tunes the loop circuit to the frequency of the framing signal and the other frequencies are filtered out. Tube 151 is normally blocked by the negative bias in resistance 187 and current flows in the plate circuit only when the rectified framing signal potential is applied to resistance 188a. The other connections are similar to those in Fig. 2 and need not be described.

The operation of Fig. 12 will be apparent from the described theory of operation of Fig. 2.

Figure 14:
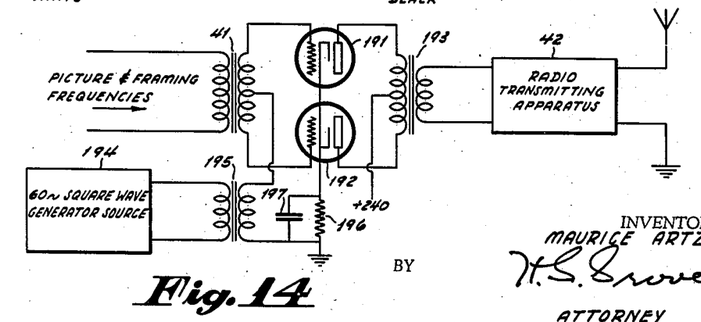
Fig. 14 shows a modified form in which the synchronizing signals amplitude-modulate the framing and picture signals.

In the modification of Fig. 14 the framing and picture signals are frequency changes as produced in Fig. 1, but the synchronizing signals are obtained by amplitude-modulating the sub-carrier wave as it is frequency-varied by the framing and picture signals.

The secondary of the transformer 41 (see also Fig. 1), containing the framing and picture signals, is connected to the input of push-pull amplifier tubes 191 and 192. The output of this push-pull stage is connected through transformer 193 to the radio transmitter, such as 42 of Fig. 1. Square wave 60 cycle source 194 is connected through transformer 195 to the common return of the push-pull input circuit. This return may also have a biasing resistor and by-pass condenser 196 and 197, respectively. This resistor is grounded to the negative side of the anode supply. The common return of the output transformer 193 may be connected to the 240 volt terminal of this supply.

The picture and framing signals are modulated in the push-pull amplifier by the 60 cycle voltage, which appears as an alternating bias in the input circuit. Fig. 15 shows the form of the modulated current or voltage, one frequency of the picture and framing frequencies, only, being indicated. It will be apparent that the 60 cycle frequency and the 2,000 to 4,000 cycle frequency of the framing and picture signals cannot be shown in true scale and the illustration is merely indicative. It is also permissible to use 60 cycles in sine wave form, but the square wave form is preferable, as it is practically free of phase shift from fading and other amplitude changes. Square wave generators are well known in the telegraph art and need not be specifically described.

The output of transformer 193 is used as in Fig. 1 to amplitude-modulate the radio frequency carrier of the radio transmitter 42.

The recording circuit for the modification of Fig. 14 will be the same as that shown in Fig. 2 and the method of operation will be that already given.

The system illustrated in Fig. 14 is simpler than the one shown in Fig. 1 and it has certain advantages in multiplex systems or combinations of facsimile and sound transmission, as the separation filters are then much simpler. However, it has the disadvantage under certain fading conditions of putting a spurious amplitude modulation on the framing and picture signals. Since the synchronizing signals are amplitude modulations in this modification, the spurious amplitude modulation would interfere to a considerable extent with the synchronizing signals.

Figure 16:
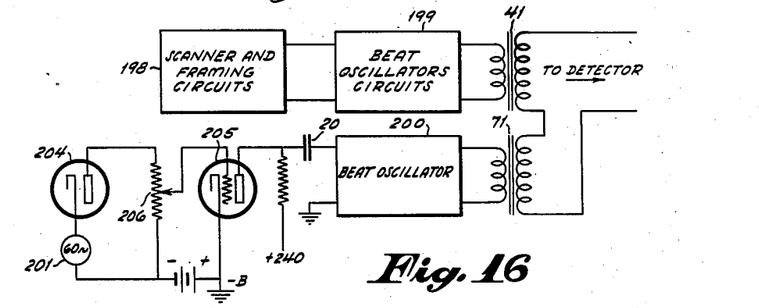
Fig. 16 is a further modification.

As a still further modification, I may send the synchronizing signals as frequency variations, as shown in Fig. 16. Here the scanner and framing circuits 198 and beat oscillator circuits 199 will be the same as those circuits in Fig. 1. The synchronizing circuit, however, will be different from that shown in Fig. 1. This will consist of a beat oscillator 200, similar to the beat oscillator 199 except that it is modulated only by the 60 cycle supply to produce approximately half cycle square waves. The 60 cycles from source 201 will cause the beat oscillator 200 to produce two frequencies, 480 cycles, indicated at 202 in Fig. 17, on one half wave and 720 cycles, indicated at 203, on the other half wave.

The 60 cycle frequency is rectified at 204 and has such high amplitude, relatively speaking, that during, say, the negative half wave, tube 205 is blocked by the negative potential in resistance 206 and during the positive half wave, full amplitude plate current flows, giving substantially square alternate waves. Condenser 20 and resistances 206 and the oscillator tank circuits are adjusted so that the beat oscillator sends out, say, 480 cycles on one half wave of the 60 cycle frequency and 720 cycles on the other half cycle.

Figure 18:
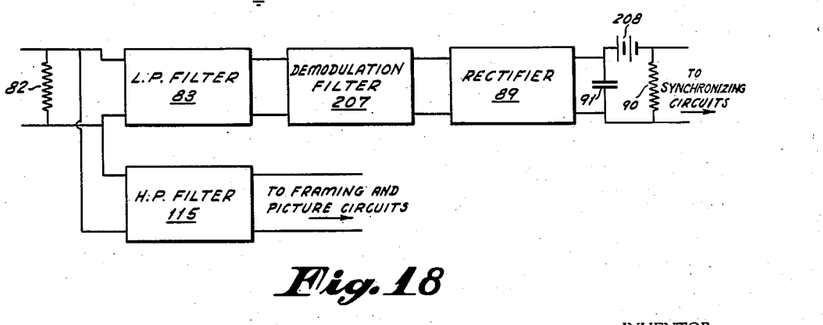
Fig. 18 illustrates in block diagram the recorder arrangement for the modification of Fig. 16.

The receiving circuit for this is indicated in Fig. 18. It will be exactly like that shown in Fig. 2 as far as the circuit for the framing and picture signals is concerned and it will be the same for the synchronizing frequency, except that a demodulation filter 207 will be placed between the low-pass filter 83 and the rectifier 89. Counter-electromotive force 208 is a threshold on this rectifier. In this circuit it will be readily apparent that the framing and picture signals will produce results already described in giving the operation of Fig. 2. The frequency variation shown in Fig. 17 containing the synchronizing signals will be excluded by high-pass filter 115, but will be passed by low-pass filter 83. The demodulation filter 207 may be either a high-pass, low-pass or band-pass filter, but by way of example let it be assumed that it is a low-pass filter. The output of this low-pass filter will be that shown in Fig. 19, which is a graph of the signal in Fig. 17 after filtering. When this is rectified and filtered as in Fig. 2, a square wave 60 cycle synchronizing signal results, as indicated by graph 209. This may be amplified and used to control the oscillator exactly in the same way as in Fig. 2.

The meaning given to the term "sub-harmonic" herein is that contained in the "Standards on Radio Receivers" of the Institute of Radio Engineers, 1938, page 2. With this meaning, the first of the decreasing series of waves is called a "fundamental" and the second is called the "second sub-harmonic."

It will be understood that various modifications may be devised for carrying out the inventions disclosed herein and the claims are not to be limited to a particular embodiment.

Having described my invention, what I claim is:

1. In photo transmitting systems, means for transmitting an alternating wave harmonic to a predetermined fundamental frequency and cyclicly interrupted at the fundamental frequency, means for receiving and extracting the interrupted harmonic frequency, a rectifier filter and limiter amplifier for converting the extracted frequency into a square wave of the fundamental frequency, an oscillator, means to keep said oscillator in step with the square wave frequency, and a synchronous recorder motor driven by the output of said oscillator.

2. In photo transmitting systems, a power supply device having a rectifier, a choke coil in the output circuit of the rectifier, an oscillator tube energized from the rectified voltage, means for changing the ripple frequency of the voltage in said choke coil to a higher frequency, means for interrupting said higher frequency at the frequency of the input to said power supply device, means to combine voltages of the frequencies of the oscillator and the first-mentioned means, a generator of radio frequency, and means to amplitude-modulate said radio frequency with said combined outputs.

3. In photo transmitting systems, a generator of alternating electromotive force, a scanning device, means to form picture signals by frequency modulating the output of said generator by variations of the scaning device, means to form framing signals by shifting the frequency of the generator at a margin of the picture on said scanning device, a generator of alternating electromotive force for producing a synchronizing signal frequency less than one half of the lowest of the signal frequencies and means for transmitting said picture and framing signals in combination with said synchronizing signals.

4. In photo transmitting systems, a generator of alternating electromotive force, a scanning device, means to form picture signals by frequency-modulating the output of said generator by the amplitude variations of the scanning device, and means to form framing signals by shifting the frequency of the generator at a margin of the picture on said scanning device beyond the limits of the frequency of the picture signals at the white end of the frequency spectrum.

5. In photo transmitting systems, a generator of alternating electromotive force, a scanning device, means to form picture signals by varying the frequency of said generator by the amplitude variations of the scanning device, means to shift the frequency of the generator at a margin of the picture on said scanning device beyond the limits of the picture signals, means to transmit the picture and framing signal frequencies, means for receiving said frequencies, means for limiting the amplitude of the picture and framing signals, a filter adapted to pass the picture and framing signals with different amplitudes, and means to separate the picture signals from the framing signals by amplitude discrimination.

6. In photo transmitting systems, a generator of alternating electromotive force, a scanning device, means to form picture signals by frequency-modulating the output of said generator by the amplitude variations of the scanning device, means to form framing signals by shifting the frequency of the generator at a margin of the picture on said scanning device beyond the limits of the frequency of the picture signals, and means to generate a synchronizing frequency below the second sub-harmonic of the framing signal.

7. In photo transmitting systems, a generator of alternating electromotive force, a scanning device, means to form picture signals by frequency modulating the output of said generator by the amplitude variations of the output of the scanning device, means to form framing signals by shifting the frequency of the generator at a margin of the picture on said scanning device beyond the limits of the picture signals, means to generate a synchronizing frequency below the second sub-harmonic of the framing signal, and means to interrupt the synchronizing frequency at a sub-harmonic thereof.

8. In photo transmitting systems, a generator of alternating electromotive force, a scanning device, means to form picture signals by modulating the output of said generator by the amplitude variations of the scanning device, means to form framing signals by shifting the frequency of the generator at a margin of the picture on said scanning device, a recorder drum having a driving motor, means for opening the circuit of the motor upon receipt of the framing signals, means to prevent said opening while the recorder is in correct frame, and means to print picture elements on said recorder by the picture signals.

9. In photo transmitting systems, a generator of alternating electromotive force, a scanning device, means to form picture signals by frequency-modulating the output of said generator by the amplitude variations of the output of the scanning device, means to form framing signals by shifting the frequency of the generator at a margin of the picture on said scanning device, a recorder having a driving motor, means to interrupt the circuit of the motor by the framing signals to bring the motor into correct frame, and means to print picture elements on said recorder by the picture signals.

10. In photo transmitting systems, a generator of alternating electromotive force, a scanning device, a synchronous motor driving said device from a source of alternating current, means to form picture signals by modulating the output of said generator by the amplitude variations of the scanning device, means to form framing signals by shifting the frequency of the generator at a margin of the picture on said scanning device, means to generate a synchronizing signal having a frequency harmonic to the frequency of said source, a filter adapted to pass only the synchronizing frequency and block the picture and framing signals, a recorder having a driving synchronous motor, means controlled by the synchronizing signals for producing an alternating voltage of the synchronizing frequency to drive said motor, means to interrupt the circuit of the motor by said framing signals to bring the recorder into correct frame, and means controlled by the picture signals for causing the recorder to print picture elements.

11. In photo transmitting systems, a generator of alternating electromotive force, a scanning device, a synchronous motor driving said device from a source of alternating current, means to form picture signals by modulating the output of said generator by the amplitude variations of the scanning device, means to form framing signals by shifting the frequency of the generator at a margin of the picture on said scanning device, means to generate a synchronizing signal having a frequency harmonic to the frequency of said source and below the second sub-harmonic of the framing signal, a filter adapted to pass only the synchronizing frequency and block the picture and framing signals, a recorder having a driving synchronous motor, means controlled by the synchronizing signals for producing an alternating voltage of the synchronizing frequency to drive said motor, means to interrupt the circuit of the motor by said framing signals to bring the recorder into correct frame, and means controlled by the picture signals for causing the recorder to print picture elements.

12. In photo transmitting systems, a generator of alternating electromotive force, a scanning device, a synchronous motor driving said device from a source of alternating current, means to form picture signals by frequency-modulating the output of said generator by the amplitude variations of the scanning device, means to form framing signals by shifting the frequency of the generator at a margin of the picture on said scanning device, means to generate a synchronizing signal having a frequency harmonic to the frequency of said source and below the second sub-harmonic of the framing signal, a filter adapted to pass only the synchronizing frequency and block the picture and framing signals, a recorder having a driving synchronous motor, means controlled by the synchronizing signals for producing an alternating voltage of the synchronizing frequency to drive said motor, means to interrupt the circuit of the motor by said framing signals to bring the recorder into correct frame, and means controlled by the picture signals for causing the recorder to print picture elements.

13. A recording device having scanning means for recording a picture, a motor driving said device, a condenser, a switch in the motor circuit, a switch in the condenser circuit, a coil adapted when energized to open the motor switch and close the condenser switch, said condenser switch closing a momentary holding circuit for said coil, means for energizing said coil by a framing signal, and means operated when the scanning means is at the picture margin of the drum to prevent energization of said coil by the framing signal.

14. A recording device having scanning means for recording a picture, a synchronous motor driving said device, adapted to be energized by an alternating electromotive force of a predetermined frequency, a condenser, a switch in the motor circuit, a switch in the condenser circuit, a coil in the condenser circuit adapted when energized to open the motor switch and close the condenser switch, said condenser circuit having a time-constant sufficient to constitute a holding circuit for said coil during a half cycle of said frequency, means for energizing said coil by a framing signal, and means operated when the scanning means is at the picture margin of the drum to prevent energization of said coil by the framing signal.

15. In photo transmitting systems, means for transmitting synchronizing and framing signals of a different frequency, a recording device, an oscillator adjusted to produce an alternating electromotive force having a frequency slightly greater than that of the synchronizing signals, means controlled by the synchronizing signals for keeping the oscillator in step therewith, a synchronous motor energized from said oscillator driving said recording device, whereby upon loss of the synchronizing signals the recording device loses frame by drifting fast, and means operated by the framing signals for bringing the recorder into frame by opening the motor circuit.

16. In photo transmitting systems, a generator of alternating electromotive force, a scanning device, means to form picture signals by frequency-modulating the output of said generator by the amplitude variations of the scanning device, means to form framing signals by shifting the frequency of the generator at the margin of the picture on said scanning device beyond the limits of the picture signals, means to generate a control frequency synchronous with the mechanical motion of said scanning device, and means to amplitude-modulate the frequency-modulated output of the said generator with the synchronizing signals of the third-mentioned means.

17. In photo transmitting systems, a generator of alternating electromotive force, a scanning device, a driving motor for said device, means to form picture signals by frequency-modulating the output of said generator by the amplitude variations of the scanning device, means to form framing signals by shifting the frequency of the generator at the margin of the picture on said scanning device beyond the limits of the picture signals, means to generate a predetermined frequency for driving said motor, and means to produce a synchronizing frequency by amplitude-modulating the frequency-modulated output of the first-mentioned generator with said predetermined frequency.

18. In picture systems for transmitting combined picture and synchronizing signals, a transmitting scanner for producing said picture signals, a synchronous motor for operating said scanner, a supply source for said motor having an alternating frequency, a frequency multiplier connected to said source for producing a frequency harmonic to the fundamental frequency thereof, means for modulating said harmonic frequency by the fundamental frequency of said source for producing said synchronizing frequency, a radio frequency generator, means for modulating the output wave of said radio frequency generator by said modulated harmonic frequency, means for transmitting and receiving said modulated output wave, means for abstracting the harmonic frequency with its fundamental wave modulation and means for extracting the fundamental frequency from the modulated harmonic frequency.

19. In picture systems for transmitting combined picture and synchronizing signals, a transmitting scanner for producing said picture signals, a synchronous motor for operating said scanner, a supply source for said motor having an alternating frequency, a frequency multiplier connected to said source for producing a frequency harmonic to the fundamental frequency thereof, means for interrupting said harmonic frequency at the fundamental frequency of said source for producing said synchronizing frequency, a radio frequency generator, means for modulating the output wave of said radio frequency generator by said modulated harmonic frequency, means for transmitting and receiving said modulated output wave, means for abstracting the harmonic frequency with its fundamental wave modulation and means for extracting the fundamental frequency from the modulated harmonic frequency.

20. In picture systems for transmitting combined picture and synchronizing signals, a transmitting scanner for producing said picture signals, a synchronous motor for operating said scanner, a supply source for said motor having an alternating frequency, a frequency multiplier connected to said source for producing a frequency harmonic to the fundamental frequency thereof, an amplifier connected to the output of said multiplier, a blocking bias in the input of said amplifier, means to apply the voltage of said fundamental frequency to the input of said amplifier for producing said synchronizing frequency, a radio frequency generator, means for modulating the output wave of said radio frequency generator by said modulated harmonic frequency, means for transmitting and receiving said modulated output wave, means for abstracting the harmonic frequency with its fundamental wave modulation and means for extracting the fundamental frequency from the modulated harmonic frequency.

21. In picture systems for transmitting combined picture and synchronizing signals, a transmitting scanner for producing said picture signals, a synchronous motor for operating said scanner, a supply source for said motor having an alternating frequency, a frequency multiplier connected to said source for producing a frequency harmonic to the fundamental frequency thereof, an amplifier tube connected to the output of said multiplier, means for blocking the plate current of said amplifying tube on alternate half cycles of said fundamental frequency for producing said synchronizing frequency, a radio frequency generator, means for modulating the output wave of said radio frequency generator by said modulated harmonic frequency, means for transmitting and receiving said modulated output wave, means for abstracting the harmonic frequency with its fundamental wave modulation and means for extracting the fundamental frequency from the modulated harmonic frequency.

22. In reception of framing and picture signals, a recorder comprising means for holding a recording sheet, means for producing picture elements on said sheet, a motor for relatively moving said recording sheet and the second means, means for opening the circuit of the motor upon receipt of the framing signals and means to prevent said opening upon fading of the framing signal while the recorder is in correct frame.

23. In photo transmitting systems, a generator of alternating electromotive force, a scanning device, means to form picture signals by modulating the output of said generator by the amplitude variations of the scanning device, means to form framing signals by shifting the frequency of the generator at a margin of the picture on said scanning device, a recorder drum having a driving motor for opening the circuit of the motor upon receipt of the framing signals and means to prevent said opening upon fading of the framing signal while the recorder is in correct frame.

24. In reception of framing and picture signals, a recorder having a framing magnet and a magnet responsive to white picture signals, means for passing framing signals current through the framing magnet while excluding all picture signal current therefrom, and means for passing framing and white picture signal current through the second-mentioned magnet while excluding black picture signal current therefrom.

25. In reception of framing and picture signals, a recorder containing a motor, a device for controlling the speed of said motor, a device for recording white picture signals and a device for recording black picture signals, means for passing framing signals to the first device while excluding all picture signals therefrom, means for passing framing and white picture signals to the second device while excluding black picture signals therefrom and means for passing black picture signals to the third device while excluding framing and white picture signals therefrom.

26. In reception of framing and picture signals, a recorder containing a motor, a magnet for controlling the speed of said motor, a magnet for recording white picture signals and a magnet for recording black picture signals, means for passing framing signal current through the first magnet and blocking all picture signal current therefrom, means for passing framing and white picture signal current through the second magnet and blocking black picture signal current therefrom and means for passing black picture signal current through the third magnet and blocking framing and white picture signal current therefrom.

MAURICE ARTZT.